(12) United States Patent
Marcus et al.

(10) Patent No.: US 8,864,313 B2
(45) Date of Patent: Oct. 21, 2014

(54) DYNAMIC ILLUMINATION CONTROL FOR LASER PROJECTION DISPLAY

(75) Inventors: Michael A. Marcus, Honeoye Falls, NY (US); Marek W. Kowarz, Henrietta, NY (US); James G. Phalen, Rochester, NY (US); John A. Agostinelli, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 792 days.

(21) Appl. No.: 12/484,374

(22) Filed: Jun. 15, 2009

(65) Prior Publication Data
US 2010/0315595 A1  Dec. 16, 2010

(51) Int. Cl.
*G02B 27/26* (2006.01)
*H04N 9/31* (2006.01)

(52) U.S. Cl.
CPC .................................. *H04N 9/3132* (2013.01)
USPC ......................... 353/7; 353/8; 348/51; 348/58

(58) Field of Classification Search
USPC .......... 353/7, 8, 9; 348/43, 51, 52, 53, 54, 55, 348/56, 57, 58, 59, 60
See application file for complete search history.

(56) References Cited

U.S. PATENT DOCUMENTS

| 5,339,118 | A | 8/1994 | Tagami |
|---|---|---|---|
| 5,982,553 | A | 11/1999 | Bloom et al. |
| 6,144,481 | A | 11/2000 | Kowarz et al. |
| 6,215,579 | B1 | 4/2001 | Bloom et al. |
| 6,307,663 | B1 | 10/2001 | Kowarz |
| 6,411,425 | B1 | 6/2002 | Kowarz et al. |
| 6,448,952 | B1 * | 9/2002 | Toyoda et al. .................. 345/97 |
| 6,452,646 | B1 | 9/2002 | Sharp et al. |
| 6,476,848 | B2 | 11/2002 | Kowarz et al. |
| 6,574,043 | B2 | 6/2003 | Ramanujan |
| 6,663,788 | B2 | 12/2003 | Kowarz et al. |
| 6,678,085 | B2 | 1/2004 | Kowarz et al. |
| 6,802,613 | B2 | 10/2004 | Agostinelli et al. |
| 7,133,184 | B2 | 11/2006 | Shin et al. |
| 7,204,594 | B2 | 4/2007 | Akiyama |
| 7,403,332 | B2 | 7/2008 | Whitehead et al. |
| 7,413,314 | B2 | 8/2008 | Kim et al. |
| 8,066,377 | B1 * | 11/2011 | Husak et al. ...................... 353/7 |
| 8,274,553 | B2 * | 9/2012 | Walker et al. .................. 348/51 |
| 2004/0090679 | A1 | 5/2004 | Kowarz |

(Continued)

FOREIGN PATENT DOCUMENTS

| JP | 2002-148712 | 5/2002 |
|---|---|---|
| JP | 2002-296677 | 9/2002 |

*Primary Examiner* — Georgia Y Epps
*Assistant Examiner* — Bao-Luan Le
(74) *Attorney, Agent, or Firm* — Nelson A. Blish; Kevin E. Spaulding (57) ABSTRACT

A display apparatus (10) has at least one color channel providing a modulated light for each of a plurality of image frames (92). One or more laser sources that provide an illumination beam having a first polarization transmission axis. An imaging modulator (854, 85g, 85b) in the path of the illumination beam is actuable to direct the modulated light toward a projection lens. A laser blanking apparatus in the path of the modulated light is disposed to block transient light between image frames and has at least one analyzer (66) having a second polarization transmission axis that is orthogonal to the first polarization transmission axis and at least one light polarization modulator that is synchronously timed to rotate polarization of transient light during an interval between frames.

12 Claims, 11 Drawing Sheets

(56) References Cited

U.S. PATENT DOCUMENTS

| | | |
|---|---|---|
| 2007/0013622 A1 | 1/2007 | Stoops |
| 2007/0127121 A1* | 6/2007 | Maximus et al. ............. 359/465 |
| 2007/0258138 A1* | 11/2007 | Cowan et al. ................. 359/443 |
| 2009/0051759 A1* | 2/2009 | Adkins et al. .................. 348/53 |
| 2009/0103051 A1* | 4/2009 | Hsu et al. .......................... 353/8 |

* cited by examiner

DYNAMIC ILLUMINATION CONTROL FOR LASER PROJECTION DISPLAY

FIELD OF THE INVENTION

The present invention relates to electronic display apparatus using spatial light modulators and more particularly relates to apparatus and methods for improved contrast in an electronic projection system.

BACKGROUND OF THE INVENTION

A critical performance measure in image projection systems is the contrast ratio (C/R) which represents the light intensity difference between the brightest white and the darkest black. C/R is thus defined by the relationship:

$$C/R = \text{white luminance/black luminance} \quad (1).$$

Improving the C/R helps to provide better on-screen image reproduction.

In general it is difficult to increase C/R by increasing the white luminance of the projection system since most projectors are light source limited. Thus approaches to improve the contrast ratio attempt to decrease the black luminance level. The black luminance level is a result of light that passes through the active display devices in the off state and stray light coming through the projection optics of the display. Stray light can come from unwanted reflections from optical components of the projection system.

There have been a number of proposed approaches to improving the contrast ratio of an electronic display. For example, in U.S. Pat. No. 7,413,314 entitled "Optical System With Iris Controlled In Real Time" to Kim et al. describes an optical system having an iris controlled in real time for reducing light from devices in the off state. In the '314 optical system, an iris controller senses luminance information in the light output and controls the projection iris according to the luminance information. With the opening range of the iris controlled in real time, the contrast ratio (C/R) is improved.

U.S. Pat. No. 7,204,594 entitled "Projector" to K. Akiyama describes a projector including an illumination device, an electro-optic modulator, and a projection optical system that includes a light shielding member provided with a stray light elimination member that reflects unwanted light away from the projection optics path.

Another approach has been to modify the display screen itself. For example, U.S. Pat. No. 7,403,332 entitled "High Dynamic Range Display Devices" to Whitehead et al describes a display having a screen incorporating a light modulator which is illuminated by a light source composed of an array of controllable light emitters. The controllable emitters and elements of the light modulator may be controlled to adjust the intensity of light emanating from corresponding areas on the screen.

Each of these conventional approaches for contrast ratio improvement has its shortcomings. The mechanical iris of the '314 disclosure must be a high-speed device and can be relatively costly. The light-shielding member of the '594 disclosure sends stray light out of the projection path and to other surfaces inside the projector, with the potential for some portion of this light to be projected onto the screen. The specialized display screen taught in the '332 disclosure adds significantly to projection system cost and may not be a suitable solution where it is desirable to replace existing film projection equipment.

Of particular interest are solutions that are appropriate for projection systems that use laser light sources. These can include, for example, systems that use spatial light imaging modulators such as liquid crystal devices (LCDs) or digital micromirror devices, such as the DLP device from Texas Instruments, Inc., Dallas, Tex.

Another type of imaging modulator device that is well-suited for use with laser sources are linear light modulators. Linear light modulators form images by a rapid, repeated sequence in which each single line of the image is separately formed and is directed to a screen or other display surface by reflection, or other type of redirection, from a scanning element. Types of linear light modulators that operate in this manner include devices such as grating light valves (GLV) offered by Silicon Light Machines and described in U.S. Pat. No. 6,215,579 (Bloom et al.), and elsewhere. Display systems based on GLV devices are disclosed, for example, in U.S. Pat. No. 5,982,553 (Bloom et al.). Another type of linear light modulator is the piezoelectric based spatial light modulator (SOM) developed by Samsung and disclosed, for example, in U.S. Pat. No. 7,133,184 to Shin et al.

An improved type of linear imaging modulator is the grating electro-mechanical system (GEMS) device, as disclosed in commonly-assigned U.S. Pat. No. 6,307,663 (Kowarz), and elsewhere. Display systems based on a linear array of conformal GEMS devices are described in commonly-assigned U.S. Pat. Nos. 6,411,425, 6,678,085, and 6,476,848 (all to Kowarz et al.). Further detailed description of GEMS device architecture and operation is given in a number of commonly-assigned U.S. patents and published applications, including U.S. Pat. No. 6,663,788 (Kowarz et al.), and U.S. Pat. No. 6,802,613 (Agostinelli et al.). In these devices, light is modulated by diffraction. On a GEMS chip, for example, a linear array of conformal electromechanical ribbon elements, formed on a single substrate, is actuable to provide one or more diffracted orders of light to form each line of pixels for line-scanned projection display.

Color display system architectures using GLV, SOM, and GEMS devices generally employ three separate color paths, red, green, and blue (RGB), each color path provided with a separate linear spatial light modulator and laser source. When actuated, the linear spatial light imaging modulator modulates its component red, green, or blue laser light to form the image, a single line of light at a time. The resulting modulated lines of light for each color are then combined onto the same output axis to provide a full-color image that is then scanned to the display screen.

In general, linear light imaging modulator arrays are advantaged over their area array spatial light modulator (SLM) counterparts by virtue of higher resolution, reduced cost, and simplified illumination optics. GLV and GEMS devices are actuable to operate at fast switching speeds for modulating laser light. GLV and GEMS devices have advantages for high resolution, high native bit depth, variable aspect ratio, and relative freedom from motion artifacts when compared against other types of spatial light modulators.

However, there are a number of limitations inherent to linear spatial light modulators that can tend to constrain projector performance. A number of limitations relate to the scanning sequence itself. The galvanometrically actuated scanning mirror that is conventionally used to scan modulated light across the display surface rotates over a short angular range to form each 2-D (two-dimensional) frame of the image. Following each scan, mirror position must then be reset into the starting position for the next scan. During this reset interval, image content is not projected, when using the standard scanning sequence. Thus, light output is not available during about 15-25% of the operating cycle, since the mirror requires some amount of time to stop, reverse direction, and return back into position for the next scan. This inherent reduction of the available light output limits the light efficiencies that can be obtained. Due to this scanning mirror reset time and to acceleration and deceleration times of the mirror, the effective duty cycle for providing modulated light with such systems, the so-called "pixel on" time, is typically no more than about 72-85%.

Another problem related resulting from the scanning sequence relates to the need to minimize the effects of stored charge as the ribbon elements are repeatedly switched between positions. Electrostatic energy is used to actuate the ribbons. Maintaining the same charge polarity for the integrated circuit (chip) substrate from one scan to the next quickly builds up a residual charge in the device that must be compensated for or dissipated in some way. In response to the problems of charge build-up, commonly-assigned U.S. Pat. No. 6,144,481 (Kowarz et al.) discloses a method for correcting for charge accumulation in the spatial light modulator device. This method applies, to the dielectric ribbon elements, a modulated bipolar voltage signal whose time average is equal to the time average of a bias voltage applied to the bottom conductive layer of the modulator device. The resulting alternating waveform switches the polarity of the substrate bias voltage effectively canceling the charge build-up during operation of the device.

Although the method described in the Kowarz et al. '481 disclosure corrects for problems related to charge build-up, however, transient movement of the modulating ribbon elements can result as the voltage is switched. Usually the voltage is switched during the reset interval of the scanning mirror and stray light can reach the screen when the voltage is switched, thus degrading system contrast. A small amount of light is also inadvertently directed into the optical system during this transient which can result in extra reflections and stray light passing through the projection optics reaching the display screen. All of these factors can degrade system contrast.

Area spatial light imaging modulators such as DLP devices do not exhibit the same switching effects as linear GEMS, SOM, and GLV devices. However, both area and linear light-modulating devices have a refresh cycle, during which unmodulated light can be inadvertently directed to the display surface. While the laser itself could be momentarily turned off to eliminate stray light during the refresh cycle, such a mode of operation is not optimal for existing semiconductor laser devices, compromising wavelength and thermal stability and potentially shortening laser lifetimes.

There is, therefore, a need for corrective measures that minimize or eliminate the negative effects of substrate switching for both area and linear spatial modulator devices and, more generally, to reduce stray light in projection apparatus where laser illumination is employed.

SUMMARY OF THE INVENTION

It is an object of the present invention to advance the art of digital image projection. With this object in mind, the present invention provides a display apparatus comprising:
  at least one color channel providing a modulated light for each of a plurality of image frames;
  one or more laser sources that provide an illumination beam having a first polarization transmission axis; and
  an imaging modulator in the path of the illumination beam and actuable to direct the modulated light toward a projection lens; and
  a laser blanking apparatus in the path of the modulated light and disposed to block transient light between image frames, comprising:
    at least one analyzer having a second polarization transmission axis that is orthogonal to the first polarization transmission axis; and
    at least one light polarization modulator that is synchronously timed to rotate polarization of transient light during an interval between frames.

Laser blanking is synchronized to the scan to minimize stray light on screen from light passing through the optics when the lasers are off the screen. During this time period, when a GEMS device is used the substrate may be flipped to eliminate hysteresis. This minimizes the stray light which occurs during the substrate flipping. The laser blanking can be accomplished by either switching the laser off or using an electrooptic modulation device. When an electrooptic modulation device is used such as an LC optical shutter, the device can also be used for dynamic illumination control. When an image has a low maximum code value, the contrast of the image can be enhanced by making the blacks appear blacker and boosting the delivered code values of the image proportionally by the amount of attenuation. Also the modulation device can be segmented so that different regions on the screen can have different amounts of attenuation. This is useful for scenes in which bright areas exist such as sunny sky at the top and dark details at the bottom of the image. As an example, if the maximum intensity of a scene is only 10% of the maximum code values in the image can be adjusted by a 10× range and the attenuator can be set for 10× attenuation. This will increase the contrast significantly.

The invention and its objects and advantages will become more apparent in the detailed description of the preferred embodiment presented below.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art. Figures shown and described herein are provided in order to illustrate key principles of operation of the present invention and are not drawn with intent to show actual size or scale. Some exaggeration may be necessary in order to emphasize relative spatial relationships or principles of operation.

Apparatus and methods of the present invention can be applied to any type of digital imaging apparatus that modulates substantially polarized light from a solid-state laser light source, in particular, from one or more semiconductor lasers or laser arrays. This can include both area spatial light imaging modulators, such as digital micromirror or DLP devices that reflect light and LCDs that reflect or transmit light, as well as linear light imaging modulators, such as GEMS and GLV devices. Embodiments of the present invention can be particularly advantageous for use with linear light modulators such as linear or multilinear grating electro-mechanical systems (GEMS) devices, GLV devices, or other types of devices that modulate light by diffraction, actuating mechanical ribbons as part of a variable grating. For the embodiments described herein, the use of the invention with a GEMS linear light imaging modulator is primarily described. However, it should be emphasized that the same apparatus and method described herein as applied to systems using GEMS devices can also be applied for use with GLV and other linear imaging modulator types, as well as for area spatial light imaging modulators that use illumination from semiconductor laser light sources.

In the following disclosure, the phrase "left-eye image" denotes the image formed by a display apparatus and intended for viewing by the left eye of the viewer. Likewise, the phrase "right-eye image" refers to the image that is intended for viewing from the right eye of the viewer. Similarly, for a dual-viewer imaging apparatus, a "first viewer image" and "second viewer image" are intended for first and second sets of viewers, respectively.

In the context of the present invention, the term "chip" is used as it is familiarly used by those skilled in the microelectromechanical device arts. The term chip refers to the one-piece electromechanical circuit package that includes one or more linear light modulator arrays formed on a single substrate, such as the conformal grating devices described in detail in commonly-assigned U.S. Pat. No. 6,411,425 (Kowarz et al.), mentioned earlier. The GEMS chip not only includes the elongated ribbon elements that form the light-modulating grating for light reflection and diffraction, but may also include the underlying circuitry that applies the electrostatic force that is used to actuate these ribbon elements. In manufacture, the tiny electronic and mechanical components that form the chip, such as the GEMS chip shown in the Kowarz et al. '425 patent, are fabricated onto a single substrate. The chip package also includes signal leads for interconnection and mounting onto a circuit board or other suitable surface.

Figure 1:
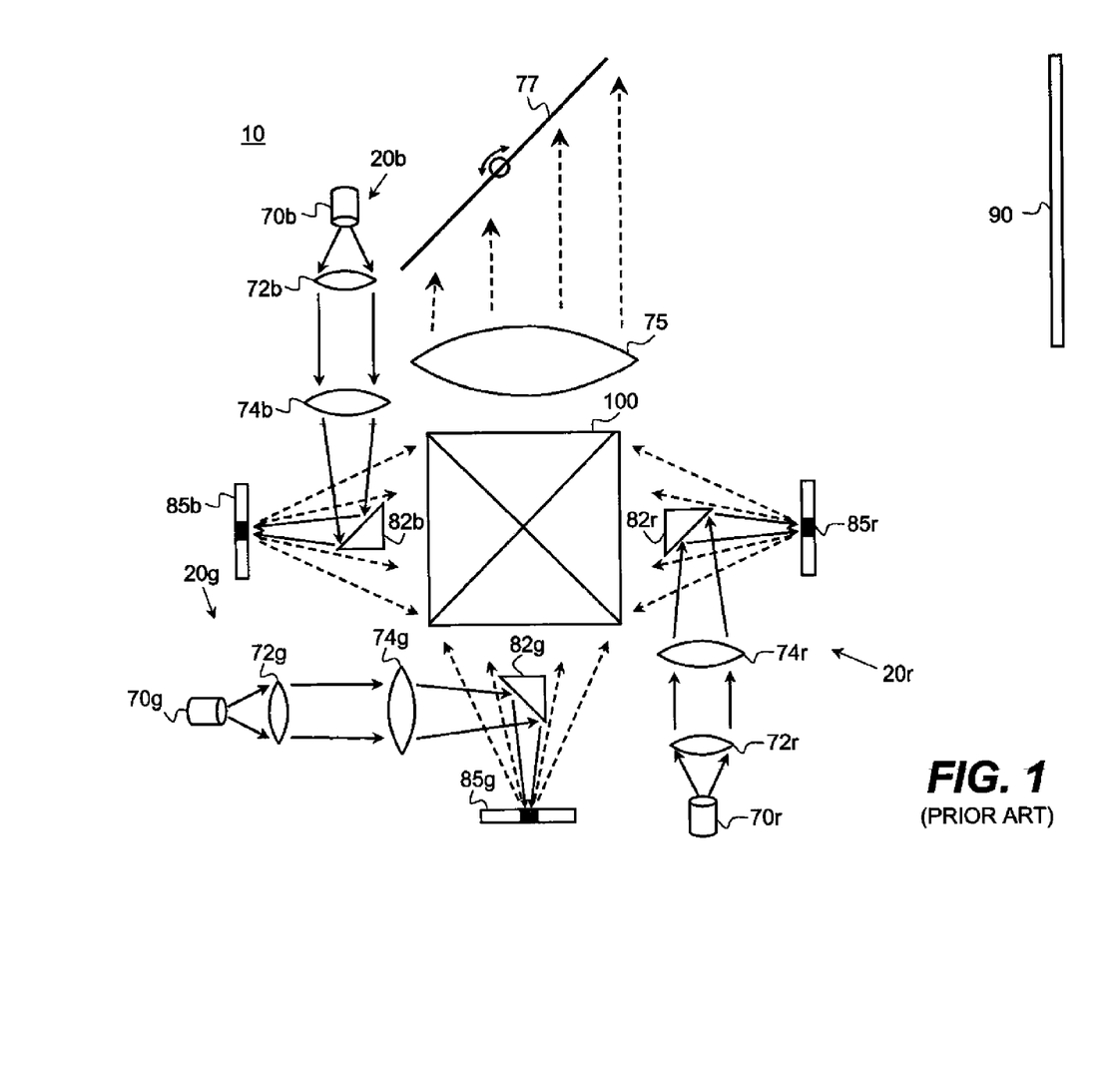
FIG. 1 is a schematic block diagram that shows components of a projection apparatus that uses a GEMS imaging modulator in each color channel.

Referring to FIG. 1, there is shown a projection display apparatus 10 using a GEMS device as linear light imaging modulator in each of three color channels, a red color channel 20r, a green color channel 20g, and a blue color channel 20b. For red color modulation, a red light source 70r, typically a laser or laser array, provides illumination that is conditioned through a spherical lens 72r and a cylindrical lens 74r and directed towards a turning mirror 82r. Light reflected from turning mirror 82r is modulated by diffraction at a linear light imaging modulator 85r, shown and described herein as an electromechanical grating light modulator. Modulated diffracted light from linear light imaging modulator 85r is diffracted past turning mirror 82r and to a color combiner 100, such as an X-cube or other dichroic combiner. The modulated line of light from color combiner 100 is then directed by a lens 75, through an optional cross-order filter (not shown), to a scanning element 77 for projection onto a display surface 90. Scanning element 77 can be a scanning mirror or other suitable light-redirecting scanning element, such as a rotating prism or polygon or an apparatus having one or more coupled reflective surfaces, which apparatus, in turn, directs the incident modulated lines of light for forming 2D images toward display surface 90. Green color modulation uses a similar set of components for providing light to color combiner 100, with a green light source 70g, typically a laser or laser array, providing illumination through a spherical lens 72g and a lens cylindrical 74g and directed towards a turning mirror 82g. Light reflected from turning mirror 82g is modulated by diffraction at an electromechanical grating light modulator that serves as a linear light imaging modulator 85g. Modulated diffracted light from linear light imaging modulator 85g is diffracted past turning mirror 82g and to color combiner 100. Similarly, blue light source 70b, typically a laser or laser array, provides illumination through a spherical lens 72b and a cylindrical lens 74b and directs light towards a turning mirror 82b. Light reflected from turning mirror 82b is modulated by diffraction at an electromechanical grating light modulator that serves as a linear light imaging modulator 85b, is diffracted past turning mirror 82b, and is sent as a line of light to color combiner 100.

Figure 2:
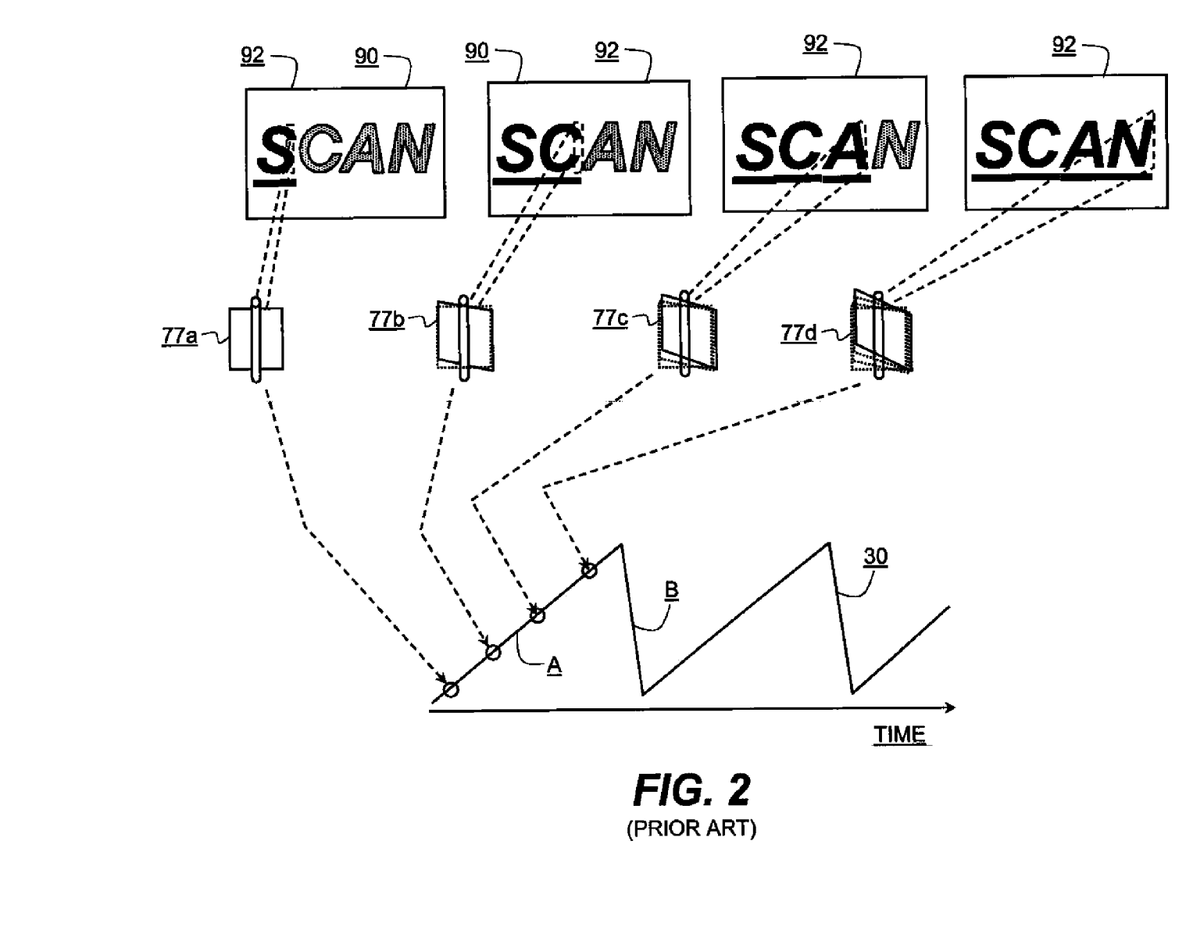
FIG. 2 is a timing diagram that shows how the scan sequence operates for forming an image frame using a linear spatial light imaging modulator.

FIG. 2 shows conventional scan timing, representing what happens on the rising or writing portion A and falling or retrace portion B of a drive signal 30, the timing control signal that is provided to scanning element 77. Two adjacent signal curve portions A and B correspond to a single cycle of scanning element 77 movement. Writing data on the screen using the linear light imaging modulators 85r, 85g, and 85b occurs in this example when scanning element 77 redirects lines of modulated light to successive positions, from left to right, generating an image frame 92 on display surface 90, during portion A of drive signal 30. During the retrace portion B in FIG. 2 the scanner is moving from the right to left at a faster rate than it moved during the writing portion of the scan and no data is written to the screen during the retrace portion B. The upper portion of FIG. 2 shows "snapshots" of scanning progress at successive positions of the scanning element, shown as 77a, 77b, 77c, and 77d, respectively.

As noted earlier with reference to the Kowarz et al. '481 patent, performance of the GLV or GEMS ribbons can be degraded both by long-term actuation and by charge deposition in repeated actuation, which causes "stiction" and other negative performance effects. Therefore, in practice, the GEMS device is neither driven with too many pulses of the same polarity nor are the pixels driven continuously within an image frame. Because of this, various timing schemes continually reverse the actuation voltage polarity using a grounded substrate and a bipolar high voltage driver for each pixel or, alternately, repeatedly switch the substrate bias voltage itself. After each image frame is displayed, the substrate is driven to the opposite voltage polarity. The substrate flipping approach is lower cost because it can be implemented with simple drivers that switch between two voltage levels. However, with this approach, there is some transient effect that can result in unintended leakage of light during the frame refresh cycle.

Figure 3:
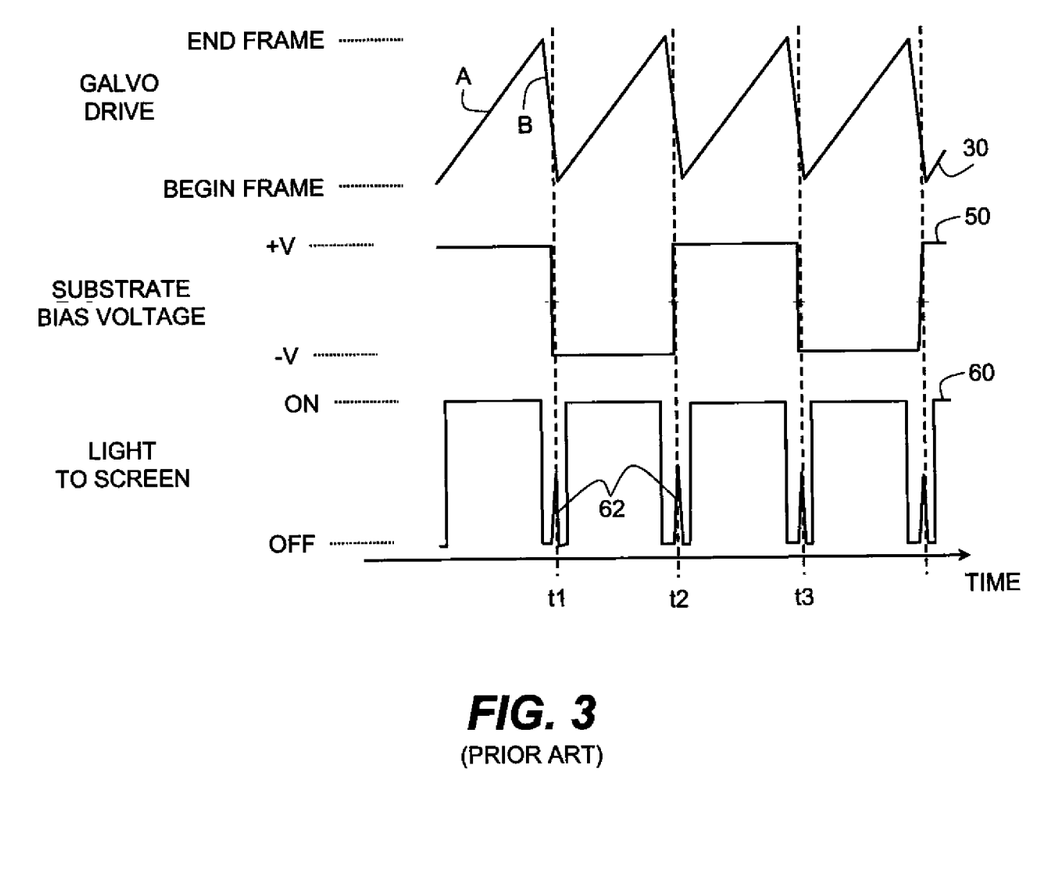
FIG. 3 is a timing diagram that relates the galvo drive signal with substrate switching and light delivery to the screen without employing methods and apparatus of the present invention.

The timing diagram FIG. 3 shows the temporal relationship of galvo drive signal 30 and a switched substrate bias voltage 50 and shows the effect of these switching signals as it relates to light delivery and light leakage. A light timing signal 60 shows the light ON or enabled, during writing portion A of the scanning cycle as the image is being scanned to the display, as was described with reference to FIG. 2. However, during retrace portion B of the scanning cycle, an output light transient 62 is detected due to unintended ribbon element movement. As shown in FIG. 3, light transient 62 repeats at each transition of substrate bias voltage 50, that is, once during each retrace portion B of the galvo mirror. The time interval between times t1, t2, and t3 as shown is approximately 16 msec in one embodiment.

Figure 4:
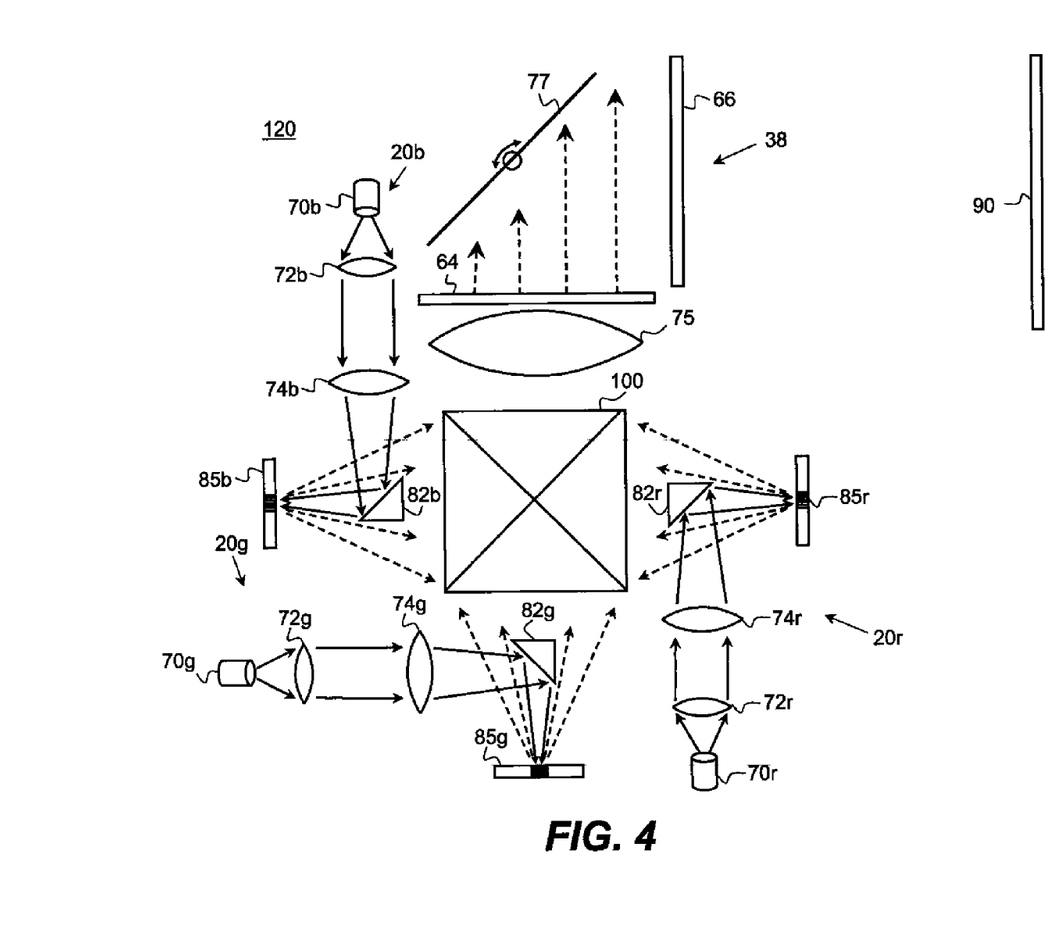
FIG. 4 is a schematic block diagram showing a laser blanking apparatus in a projection apparatus according to an embodiment of the present invention.

The schematic block diagram of FIG. 4 shows how this light transient is suppressed by a laser blanking apparatus 38 in one embodiment of a display apparatus 120 of the present invention. Laser blanking apparatus 38 has two types of components: (i) a phase-modulating electro-optical modulator 64 that is a light polarization modulator disposed in the path of the combined modulated light, and (ii) an analyzer 66. When actuated by a control signal, electro-optical modulator (EOM) 64 changes the phase of the incident light, effectively rotating the polarization of the incident light by 90 degrees. Analyzer 66 has its transmission axis in parallel with light sources 70r, 70g, and 70b, so that modulated light passes through to display surface 90. Thus, analyzer 66 blocks the light that is modulated when EOM 64 is actuated.

Alternately, the mode of operation of the phase-modulating electro-optic modulator 64 can be reversed, so that, when not actuated by a control signal, it changes the phase of the incident light by 90 degrees and, when actuated, it causes 0 degree change to the polarization.

Figure 5:
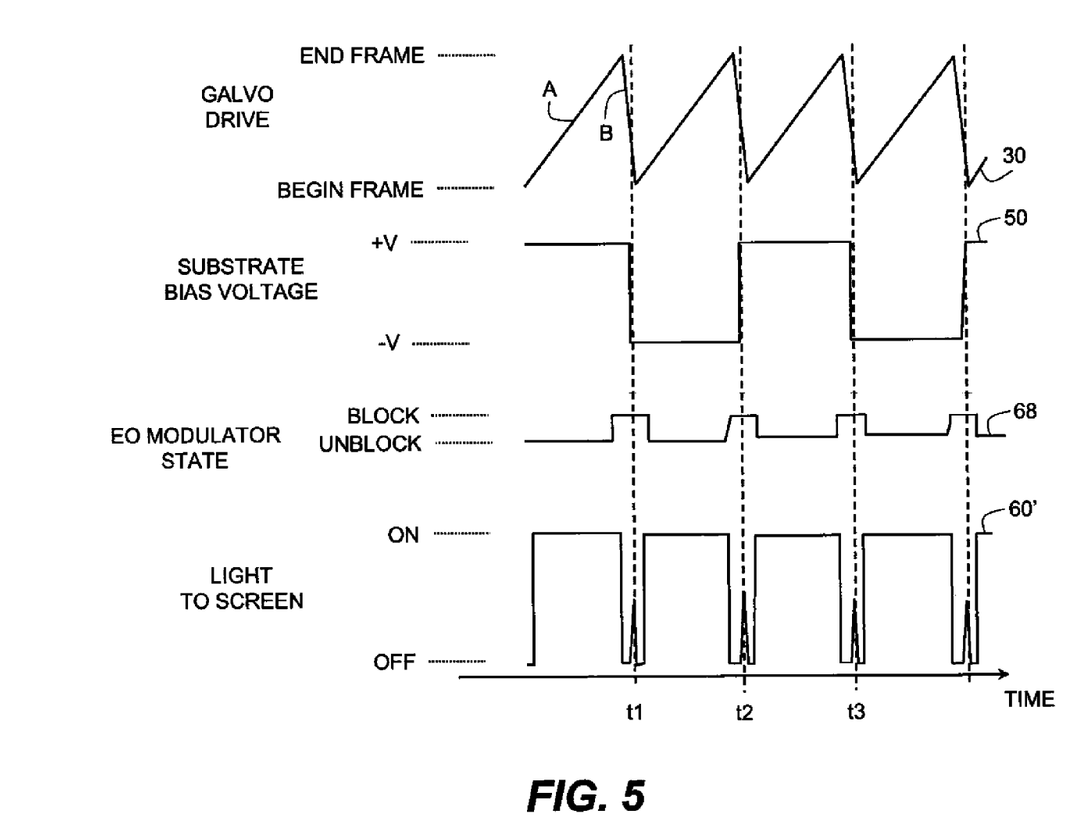
FIG. 5 is a timing diagram that relates the galvo drive signal with substrate switching and light delivery to the screen with the use of the laser blanking apparatus of FIG. 4.

The timing diagram of FIG. 5 shows the timing of an EOM signal 68 relative to drive signal 30 and bias voltage 50, and shows how EOM actuation impacts light timing signal 60'. The light transient (light transient 62 in FIG. 3) is suppressed, eliminating this unwanted light from the output.

Figure 6:
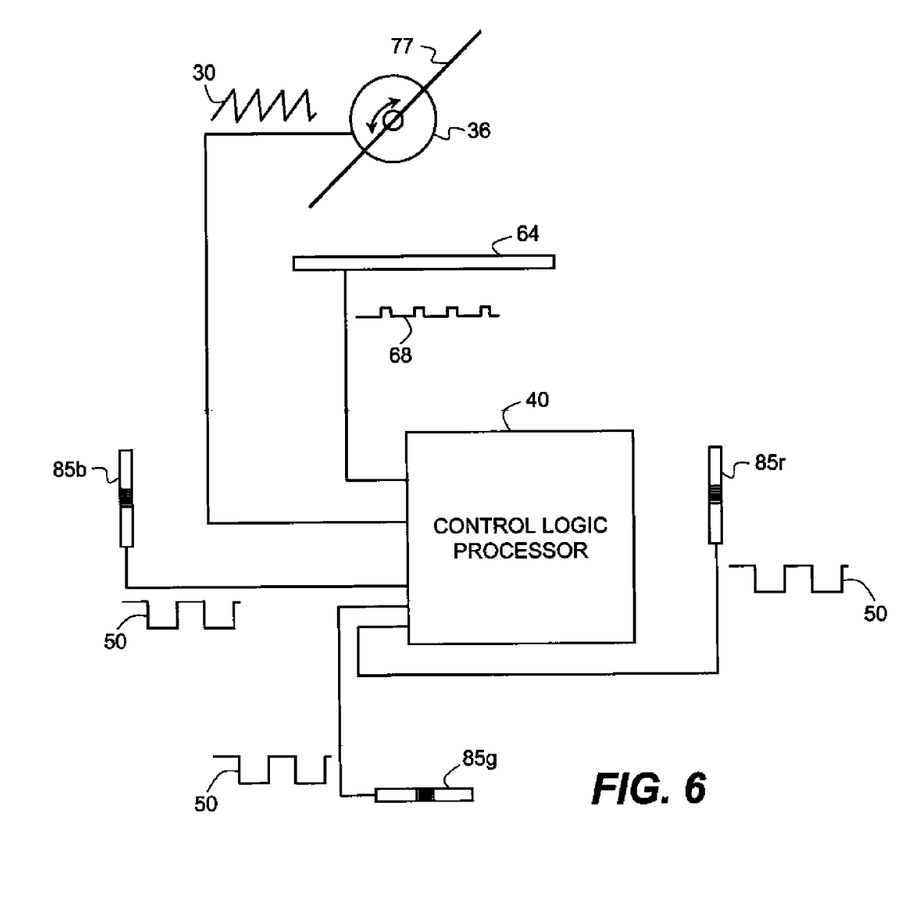
FIG. 6 is a schematic block diagram showing the underlying control logic circuitry that coordinates the synchronization of the laser blanking apparatus in an embodiment of the present invention.

The schematic block diagram of FIG. 6 relates the signals shown in FIG. 5 to controlled components of display apparatus 120 shown in FIG. 4. A control logic processor 40, through intermediary driver circuitry (not shown) provides drive signal 30 to a galvo motor 36 to execute the scanning sequence described earlier. Control logic processor 40, through intermediary driver circuitry (not shown), synchronously provides the alternating substrate bias voltage 50 to linear light imaging modulators 85r, 85g, and 85b in each respective color channel. EOM signal 68 is provided to electro-optical modulator 64, again through intermediary driver circuitry (not shown).

Figure 7:
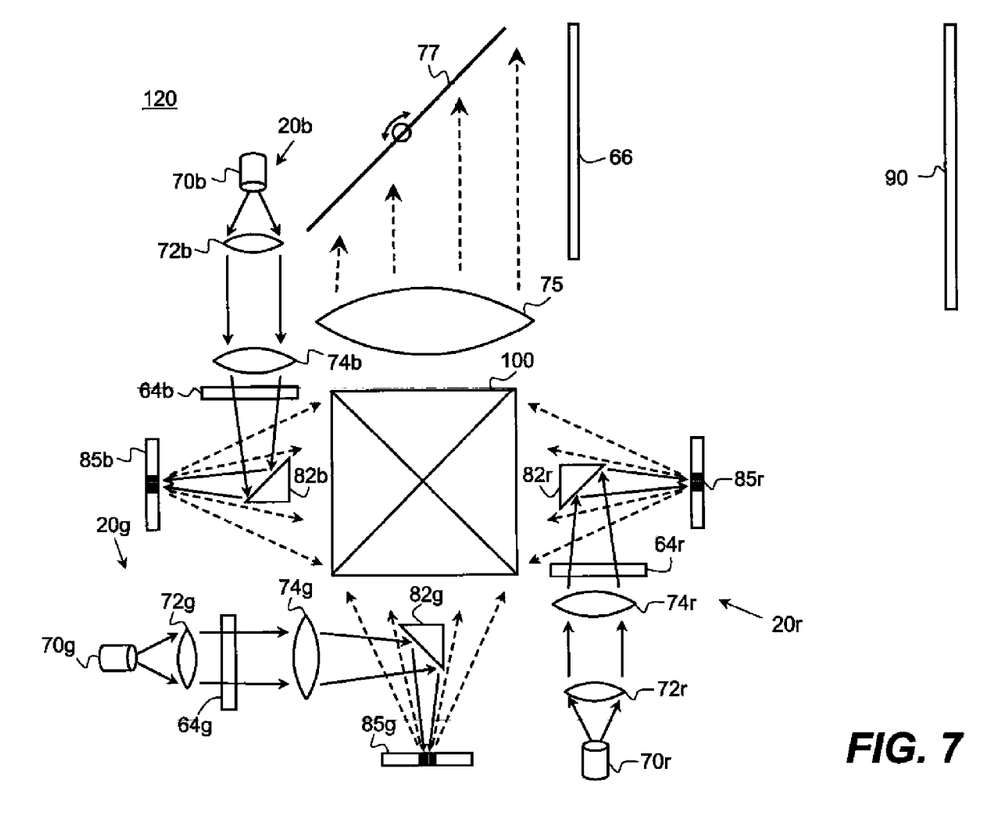
FIG. 7 is a schematic block diagram showing a laser blanking apparatus in a projection apparatus according to an alternate embodiment of the present invention.

Laser blanking apparatus 38 can provide the needed shuttering of light in a number of different embodiments. Referring to FIG. 4, for example, the electro-optical modulator 64 and the analyzer 66 can be placed in series along the modulated light path, with or without other optical components between them. The alternate embodiment of FIG. 7 shows an embodiment of display apparatus 120 with an EOM 64r, 64g, 64b in each color channel and a single analyzer 66 at the output. Alternately, each channel may have an analyzer and an EOM. It may be sufficient for some applications to provide laser blanking apparatus 38 to one or more color channels, such as only to the green color channel, which has the most pronounced effect on luminance.

In order to switch at sufficiently high rates for laser blanking, EOM 64 must have a fast response time. Until recently, EOM devices were not able to respond quickly enough for the display apparatus timing described with reference to FIG. 4. However, more recent improvements in EOM speed and overall performance are now making it possible to use these devices for the laser blanking required between image frames. EOMs that can be used for laser blanking as described with reference to FIGS. 4 and 7 can be any suitable types of devices, such as VX series modulators from Boulder Nonlinear Systems, Inc., Lafayette, Colo.

It should be noted that other types of laser blanking could also be provided, such as using mechanical shutters or other types of light modulation devices in the output path. However, the use of EOM devices for providing EOM signal 68 does not require moving parts or motors and can absorb the unwanted light transients without introducing sources of noise or vibration. Other approaches for laser blanking include shutting off the lasers themselves; however, the laser sources used for digital projection applications generally operate best in continuous wave (CW) mode. High speed switching for lasers used in projection can have adverse effects on laser stability and performance and can significantly shorten laser lifetimes.

Use with 3-D and Dual-Viewer Embodiments

Figure 8:
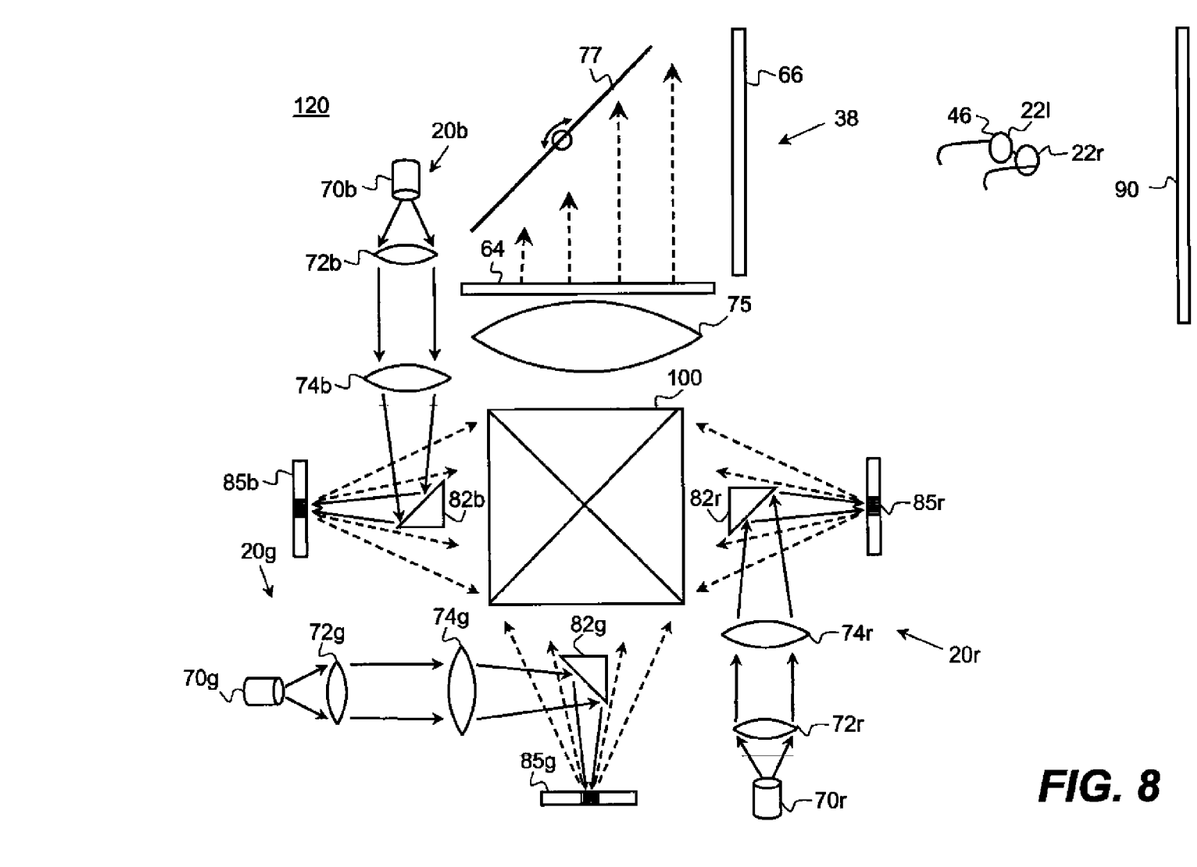
FIG. 8 is a schematic block diagram showing a laser blanking apparatus in a projection apparatus according to alternate embodiment of the present invention useful for 3-D image projection.

Methods and apparatus of the present invention can also be applied to imaging apparatus that provide 3-D imaging or dual-viewer imaging, such as apparatus described, for example, in commonly assigned co-pending U.S. patent application Ser. No. 12/116,467 filed May 7, 2008, entitled "Display Using Bidirectionally Scanned Linear Modulator". The schematic block diagram of FIG. 8 shows the use of glasses 46 having left and right distinction elements 22l and 22r respectively. In one embodiment, glasses 46 are shutter glasses, alternately shuttering the image for the left and right eyes of the viewer, synchronous with the image refresh rate. For such an embodiment, the timing described earlier with respect to FIG. 5 can be applied, so that the electro-optical modulator(s) can suppress light during each frame-refresh transition, in a manner similar to that described earlier.

Electro-optical modulator timing can also be applied in embodiments where bidirectional scanning is used for forming the image from a linear light modulator. In the timing diagram of FIG. 9, the scan sequence for both left- and right eye images is summarized schematically. The scanning cycle, shown at S in the figure, has both forward (A) and retrace (B) portions. The left-eye image is formed as scanning element 77 progressively scans in one direction, shown as left to right in FIG. 9, during the A portion of a scanning element drive signal 32. This movement scans from a first edge of the image E1 to a second edge E2.

Figure 9:
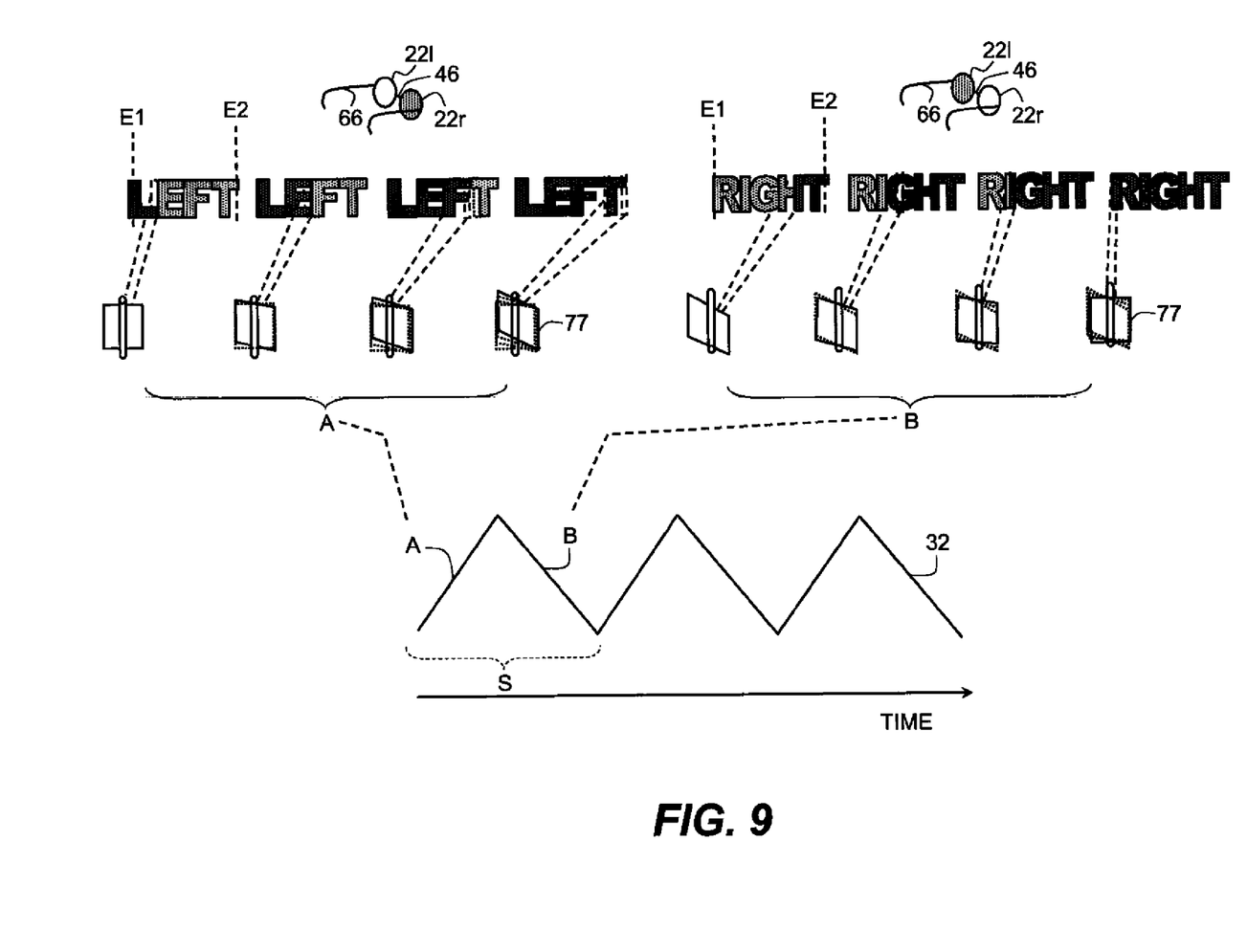
FIG. 9 is a timing diagram showing the scan sequence for the left- and right-eye images during 3-D viewing using the apparatus of FIG. 8.

The retrace or B portion shown in FIG. 9 is extended from that described with reference to FIGS. 2 and 3, so that the waveform is triangular (that is, symmetric), as shown. The right-eye image is then formed by progressively scanning in the opposite (retrace) direction during this B portion. This movement scans from second edge E2 of the image back toward first edge E1. Shutter glasses 46 are used in one embodiment, synchronized with the scan timing for cyclically distinguishing the left-eye image from the right-eye image, directing the intended image to the appropriate eye of the viewer and blocking the alternate image. Where timing drive signal 32 is at 60 Hz, shutter glass switching between eyes occurs at 120 Hz. Cycling between transmission for each successive left or right-eye image is also at 60 Hz.

Figure 10:
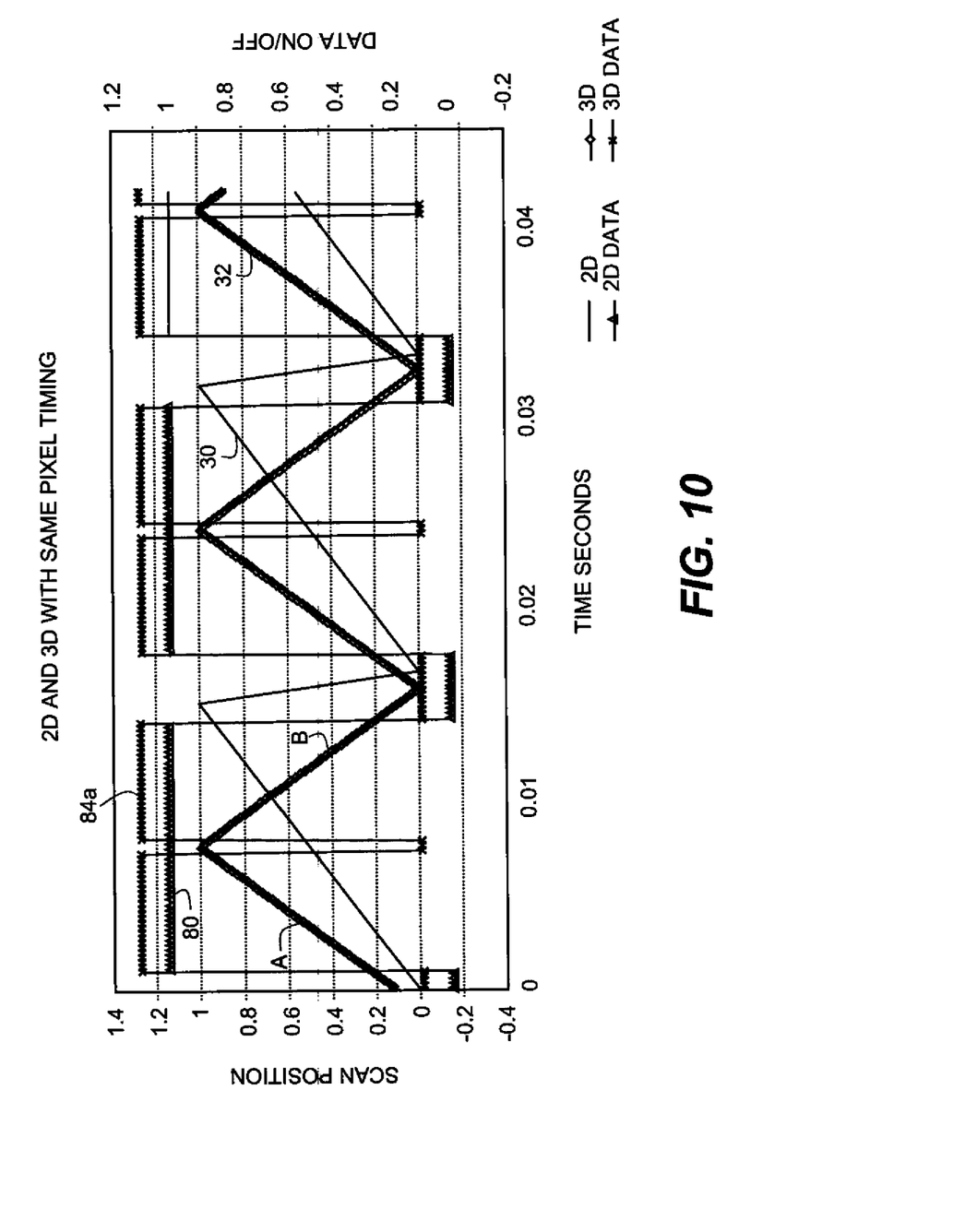
FIG. 10 is a timing diagram that shows how the apparatus of FIG. 8 can be adapted for 2-D or 3-D viewing.

The timing diagram of FIG. 10 shows how the apparatus of FIG. 8 can be adapted to provide either 2-D imaging or 3-D (or dual viewer) imaging. Here, multiple timing diagrams are overlaid onto each other to make this comparison. The timing diagram shown in FIG. 10 shows the scanning element drive signal and data timing for an embodiment in which the total time for scanning a left- and right-eye image according to the method of the present invention (with a triangular drive signal waveform) is the same as that conventionally used for forming a 2-D image (shown with a sawtooth drive signal waveform as in FIG. 2). The scanning mirror drive signal 30 and data writing curve 80 correspond to 2-D display embodiments; a drive signal 32 and data timing 84a correspond to 3-D display embodiments. In this case, the time-per-pixel intervals, or "pixel on" time for 2-D and 3-D projection can be the same. Advantageously, the clock timing for providing each line of image data to the linear light modulator can be the same as the clock timing used for 2-D embodiments in which the image is formed by the scan in a single direction.

Shutter glasses use synchronized timing for separating left- and right-eye images for 3-D viewing or, alternately, for separating first viewer and second viewer images displayed to two different sets of viewers. An alternate type of separation mechanism can be provided using spectral differences, as is familiar to those in the stereoscopic imaging arts. Briefly, spectral distinction works by using different sets of red, green, and blue component colors to form the color image for each eye (or, alternately, for each set of viewers). Even more complex possibilities have been proposed, such as using combinations of spectral difference and shutter glass timing, as described, for example, in commonly assigned co-pending U.S. patent application Ser. No. 12/351,190 filed Jan. 9, 2009, entitled "Dual-View Stereoscopic Display Using Linear Modulator Arrays" that provides both stereoscopic and dual-viewer capabilities.

Although the stereoscopic (3-D) or dual-viewer applications may utilize more complex image timing and other parameters than those required for the basic 2-D imaging described earlier with reference to FIGS. 4-7, both types of imaging share a common timing occurrence, that is, the need for image refresh. During the brief refresh interval, it is advantageous to provide a mechanism for suppressing stray light at the output of the projection apparatus.

Figure 11:
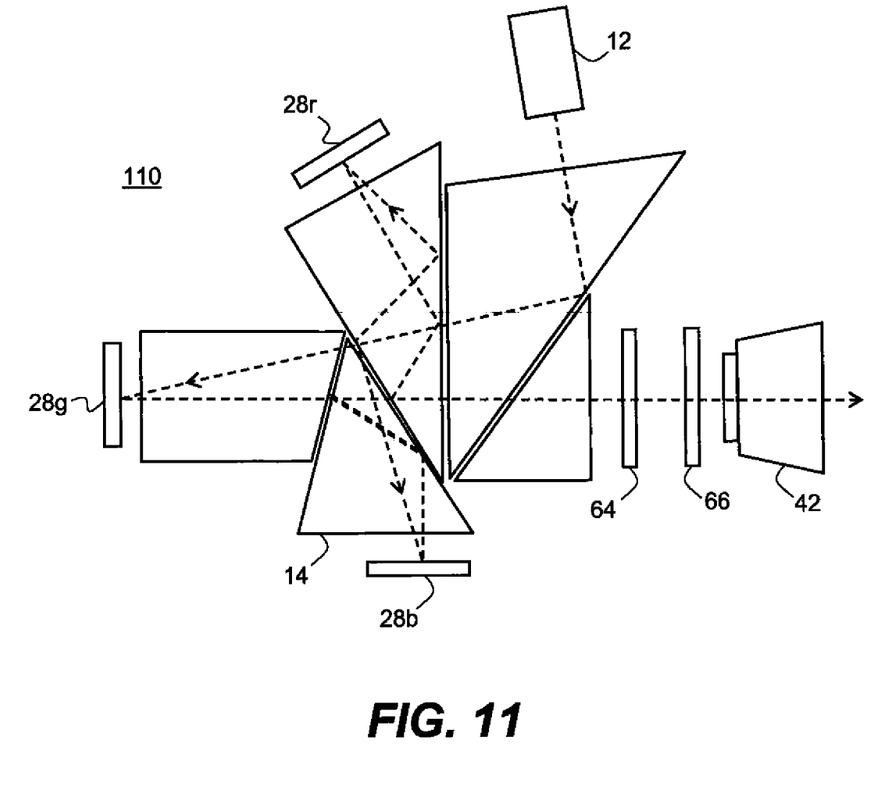
FIG. 11 is a schematic block diagram showing a laser blanking apparatus in a projection apparatus according to an alternate embodiment of the present invention using DMD devices.

As noted earlier, apparatus and methods of the present invention also find application when used with area spatial light modulators, such as digital micromirror devices (DMDs). The schematic block diagram of FIG. 11 shows an embodiment of a display apparatus 110 that uses DMD spatial light modulators. A light source 12 directs polychromatic unpolarized illumination into a prism assembly 14, such as a Philips prism, for example. Prism assembly 14 splits the polychromatic light into red, green, and blue component wavelength bands and directs each band to a corresponding spatial light modulator 28r, 28g, or 28b. Prism assembly 14 then recombines the modulated light from each imaging SLM 28r, 28g, and 28b and directs this unpolarized light to a projection lens 42 for projection onto a display screen or other suitable surface. In a manner similar to that described earlier with reference to FIGS. 4 and 7, analyzer 66 and electro-optical modulator 64 cooperate to suppress output light from display apparatus 110 during image refresh. Alternatively light source 12 can comprise multiple polarized monochromatic light sources in the red, green, and blue wavelength bands.

The apparatus and methods of the present invention reduce the amount of stray light that would otherwise be projected onto the display surface and degrade image contrast. Using the apparatus and method of the present invention, contrast for the digital projection apparatus can be significantly improved and brought even closer to the range provided from high-end commercial projection equipment.

The invention has been described in detail with particular reference to certain preferred embodiments thereof, but it will be understood that variations and modifications can be effected within the scope of the invention.

PARTS LIST 10 display apparatus
12 light source
14 prism assembly
20r red color channel
20g green color channel
20b blue color channel
22l, 22r. left and right distinction element
28r, 28g, 28b spatial light modulator
30 drive signal
32 drive signal
36 galvo motor
38 laser blanking apparatus
40 control logic processor
42 lens
46 glasses
50 bias voltage
60, 60' light timing signal
62 light transient
64, 64r, 64g, 64b electro-optical modulator
66 analyzer
68 EOM signal
70r red light source
70g green light source
70b blue light source
72r spherical lens, red
72g spherical lens, green
72b spherical lens, blue
74r cylindrical lens, red
74g cylindrical lens, green
74b cylindrical lens, blue
75 lens
77 scanning element
77a scanning element
77b scanning element
77c scanning element
77d scanning element
80 data writing curve
82r turning mirror, red
82g turning mirror, green
82b turning mirror, blue
84a data timing
85r linear light modulator
85g linear light modulator
85b linear light modulator
90 display surface
92 image frame 100 color combiner
110 display apparatus
120 display apparatus
A, B. Drive signal portion
E1, E2. Edge
S Scanning cycle
t1, t2, t3. Time

The invention claimed is:

1. A display apparatus comprising:
 at least one color channel providing a modulated light for each of a plurality of image frames, wherein an image frame is a single image formed by the modulated light, each color channel including:
  one or more laser sources that provide a polarized illumination beam; and
  an imaging modulator in the path of the illumination beam actuable to modulate light in the illumination beam and direct the modulated light toward a projection lens; and
 a laser blanking apparatus in the path of the modulated light from the imaging modulator and disposed to block stray light from optical components of the display system during time intervals between successive image frames, the laser blanking apparatus including:
  a light polarization modulator that is synchronously timed to control the polarization of the modulated light to provide light having only a first polarization during all image frame time intervals and light having only a second polarization orthogonal to the first polarization during the time intervals between image frames; and
  an analyzer having a polarization transmission axis that transmits light from the polarization modulator of the first polarization thereby transmitting the image frames and does not transmit light from the polarization modulator of the second polarization thereby blocking the stray light.

2. The display apparatus of claim 1 wherein the light polarization modulator is an electro-optical modulator.

3. The display apparatus of claim 1 wherein the laser blanking apparatus comprises an analyzer within each of a plurality of color channels.

4. The display apparatus of claim 1 wherein the laser blanking apparatus comprises an electro-optical modulator within each of a plurality of color channels.

5. The display apparatus of claim 1 wherein the imaging modulator is a linear light modulator taken from the group consisting of a grating electromechanical device, a piezoelectric based spatial light modulator, and a grating light valve.

6. The display apparatus of claim 1 wherein the imaging modulator is an area spatial light modulator taken from the group consisting of a digital micromirror device and a liquid crystal device.

7. The display apparatus of claim 1 wherein the display apparatus forms a three-dimensional or a dual-viewer image.

8. A display apparatus comprising:
 a) at least one color channel providing successive lines of modulated light for each of a plurality of image frames, wherein an image frame is a single image formed by the modulated light, each color channel including:
  one or more laser sources that provide a linear polarized illumination beam; and
  a linear light imaging modulator in the path of the illumination beam and comprising an array of ribbons actuated to form the line of modulated light;
 b) a scanning element and a projection lens for forming each image frame by scanning each modulated line of light from the at least one color channel toward a display surface; and
 c) a laser blanking apparatus in the path of the modulated light from the imaging modulator and disposed to block stray light from optical components of the display system during time intervals between successive image frames, including:
  a light polarization modulator that is synchronously timed to control the polarization of the modulated light to provide light having only a first polarization during all image frame time intervals and light having only a second polarization orthogonal to the first polarization during the time intervals between image frames; and
  an analyzer having a polarization transmission axis that transmits light from the polarization modulator of the first polarization thereby transmitting the image frames and does not transmit light from the polarization modulator of the second polarization thereby blocking the stray light.

9. The display apparatus of claim 8 wherein the light polarization modulator is an electro-optical modulator.

10. The display apparatus of claim 8 wherein the laser blanking apparatus comprises an analyzer within each of a plurality of color channels.

11. The display apparatus of claim 8 wherein the laser blanking apparatus comprises an electro-optical modulator within each of a plurality of color channels.

12. The display apparatus of claim 8 wherein the imaging modulator is a linear light modulator taken from the group consisting of a grating electromechanical device, a piezoelectric based spatial light modulator, and a grating light valve.

* * * * *